US010005466B2

(12) United States Patent
Wu et al.

(10) Patent No.: US 10,005,466 B2
(45) Date of Patent: Jun. 26, 2018

(54) ENGINE POWER MODULATION IN A VEHICLE

(71) Applicant: International Engine Intellectual Property Company, LLC, Lisle, IL (US)

(72) Inventors: Shouhao Wu, Roselle, IL (US); Grzegorz Siuchta, Des Plaines, IL (US)

(73) Assignee: International Engine Intellectual Property Company, LLC., Lisle, IL (US)

( * ) Notice: Subject to any disclaimer, the term of this patent is extended or adjusted under 35 U.S.C. 154(b) by 0 days. days.

(21) Appl. No.: 15/463,798

(22) Filed: Mar. 20, 2017

(65) Prior Publication Data
US 2018/0111620 A1    Apr. 26, 2018

Related U.S. Application Data

(60) Provisional application No. 62/411,804, filed on Oct. 24, 2016.

(51) Int. Cl.
*B60W 30/188* (2012.01)
*F02D 41/10* (2006.01)
*F02D 41/30* (2006.01)
*B60W 10/06* (2006.01)
*B60W 10/02* (2006.01)

(52) U.S. Cl.
CPC .......... *B60W 30/188* (2013.01); *B60W 10/02* (2013.01); *B60W 10/06* (2013.01); *F02D 41/107* (2013.01); *F02D 41/3005* (2013.01)

(58) Field of Classification Search
None
See application file for complete search history.

(56) References Cited

U.S. PATENT DOCUMENTS

| 4,078,631 | A | * | 3/1978 | Kadota | B60K 31/105 |
| | | | | | 123/325 |
| 6,990,951 | B1 | | 1/2006 | Liu | |
| 7,983,830 | B2 | * | 7/2011 | Yu | B60K 6/48 |
| | | | | | 180/178 |
| 8,214,122 | B2 | * | 7/2012 | Krupadanann | B60W 10/06 |
| | | | | | 180/170 |
| 8,340,884 | B1 | * | 12/2012 | He | B60W 30/18072 |
| | | | | | 340/439 |
| 8,825,339 | B2 | * | 9/2014 | Shono | B60K 6/445 |
| | | | | | 701/22 |
| 8,868,312 | B2 | * | 10/2014 | Pedlar | B60K 31/047 |
| | | | | | 123/350 |
| 9,063,829 | B2 | * | 6/2015 | Yu | G06F 17/00 |
| 9,527,514 | B2 | * | 12/2016 | Yu | B60K 6/48 |
| 9,862,375 | B2 | * | 1/2018 | Yu | B60W 20/15 |
| 2006/0005791 | A1 | | 1/2006 | Obidi | |
| 2006/0005805 | A1 | | 1/2006 | Liu | |
| 2006/0048754 | A1 | | 3/2006 | Naganawa | |
| 2006/0060171 | A1 | | 3/2006 | Liu | |

* cited by examiner

*Primary Examiner* — Dirk Wright
(74) *Attorney, Agent, or Firm* — Jack D. Nimz; Jeffrey P. Calfa

(57) ABSTRACT

A control strategy for a vehicle powered by an internal combustion engine has a repeating cycle of accelerating the vehicle during a more fuel efficient acceleration phase of the cycle followed by a deceleration phase of the cycle which uses little or no fuel.

15 Claims, 3 Drawing Sheets

ENGINE POWER MODULATION IN A VEHICLE

This application claims priority of pending Provisional Patent Application No. 62/411,804 filed Oct. 24, 2016.

TECHNICAL FIELD

The present disclosure relates to a vehicle having a prime mover which is coupled through a drivetrain to drive wheels which propel the vehicle and also to a method of operating such a vehicle in accordance with a strategy that increases its fuel-efficiency.

BACKGROUND

As a vehicle is being driven, various road, weather, and traffic conditions are encountered. Those conditions change as the vehicle is traveling toward its destination and to correct for changes, power which is delivered to the vehicle's drive wheels is varied by the driver's actions and/or automatically by one or more controllers to adjust operation of the prime mover and/or components in the vehicle's drivetrain. For example, particular driving conditions, such as travel up a grade, typically call for the prime mover to deliver increased power to the drive wheels while other conditions, such as travel down a grade, typically call for the prime mover to deliver decreased power.

An internal combustion engine is one example of a prime mover of a vehicle. Two common types of internal combustion engine are a spark-ignited gasoline engine and a compression-ignition diesel engine. Other types of engines use natural gas or propane as fuel. In an electric powered vehicle, the prime mover is an electric motor/generator operating as a motor to propel the vehicle while drawing current from a battery bank.

The performance of an internal combustion engine can be rated in different ways using parameters such as output power, output torque, and engine speed, for example by a torque/speed curve and a power/speed curve which show peak output torque and peak output power, which may not necessarily occur at the same engine speed. Peak torque and peak power are however commonly used to rate performance of an engine.

Torque is commonly measured in pound-feet (lb-ft), and power in horsepower (hp). Speed is typically measured in crankshaft revolutions per minute (rpm). Because vehicles operate over a range of various driving conditions, engine speed, engine torque and engine power will, as mentioned above, vary depending on those conditions. So too will engine fuel efficiency.

An engine may be selected for use in a particular vehicle based on performance which is capable of providing acceptable vehicle operation for a maximum load which is expected to be imposed on the engine. An estimate of expected maximum load is based on various factors such as the size, weight, and load-carrying capacity of the vehicle, and/or the velocity which the vehicle should attain when fully loaded and travelling up a specified grade. Aerodynamic resistance may also be taken into account. A properly sized engine should have a maximum power rating for delivering enough power to handle the expected maximum load.

However because maximum power is typically used only intermittently during vehicle travel along a road such as an interstate highway, the engine will at other times operate at less than maximum rated engine power because load on the engine is less than the expected maximum load which calls for maximum rated engine power.

An internal combustion engine is inherently more fuel-efficient when operating in a zone of an engine torque/speed map which provides greater engine power than when operating in a zone which provides lesser engine power. However, when fuel economy of a vehicle is a factor in the selection of an engine for use in a particular vehicle, and it is decided to use an engine having smaller maximum rated power instead of one having larger maximum rated power, vehicle performance is sacrificed.

SUMMARY OF THE DISCLOSURE

One general aspect of the present disclosure relates to a method of controlling operation of a vehicle having an internal combustion engine as its prime mover coupled through a drivetrain to drive wheels which propel the vehicle, the engine being sized to meet defined vehicle performance criteria by possessing the capability of operating with engine power extending to a specified maximum rated engine power. However, when operation of the vehicle does not call for the engine to operate at maximum rated engine power, the disclosed method operates the engine with greater fuel efficiency than it otherwise would by using a strategy which intermittently operates the engine at or near maximum rated engine power, referred to hereinafter as a maximum engine power range for the particular engine. During periods of time between intermittent operations of the engine within the maximum engine power range, the strategy stops, or at least reduces, the rate at which the engine is being fueled from the rate which is used within the maximum engine power range while also preventing the engine from being back-driven by the drive wheels and acting as a brake on the vehicle.

More specifically, the method comprises: a) when the vehicle is traveling at a target velocity which is being maintained by control of engine fueling in accordance with a torque/speed map for the engine to control power to the drive wheels, initiating an acceleration phase by increasing the quantity of fuel being introduced into the engine to cause the engine to accelerate into a zone of the map in which fuel efficiency is greater than fuel efficiency when the engine is traveling at the target velocity, thereby causing the vehicle to accelerate by increasing power flow from the engine through a power flow path to the drive wheels; b) when acceleration of the vehicle has caused vehicle velocity to become greater than an upper velocity limit, terminating the acceleration phase and initiating a deceleration phase by reducing the quantity of fuel being introduced into the engine sufficiently to cause the engine to decelerate into a zone of the map in which fuel efficiency is less than fuel efficiency when the vehicle is traveling at the upper velocity limit and by also interrupting the power flow path to prevent the drive wheels from back-driving the engine, thereby allowing the vehicle to decelerate; and c) when the vehicle has decelerated to a vehicle velocity which no longer exceeds the target velocity, terminating the deceleration phase by restoring the power flow path and initiating the acceleration phase.

In comparison to operating the engine to maintain a constant target velocity, the described method provides increased fuel efficiency which is beneficial in reducing tailpipe emissions.

The foregoing summary is accompanied by further detail of the disclosure presented in the Detailed Description below with reference to the following drawings which are part of the disclosure.

DETAILED DESCRIPTION

Figure 1:
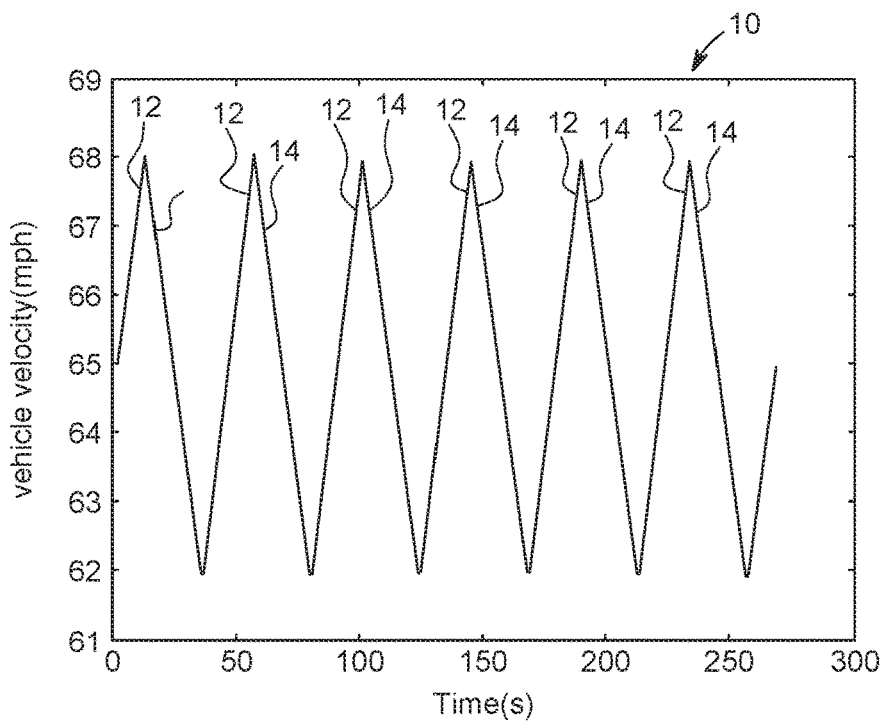
FIG. 1 is a first graph useful in understanding the method of the disclosed strategy for increasing fuel efficiency of a vehicle.

FIG. 1 is a graph 10 which portrays for the purpose of explanation how the disclosed strategy operates a vehicle which is traveling along a road. The horizontal axis represents time measured in seconds, and the vertical axis represents vehicle velocity measured in miles per hour (mph). The strategy comprises a succession of vehicle acceleration phases 12 each followed by a vehicle coast-down, or deceleration, phase 14.

The strategy starts at zero seconds with the vehicle traveling at 65 mph. The first acceleration phase 12 commences with the vehicle accelerating toward a velocity greater than 65 mph which in this example is 68 mph. When vehicle velocity reaches 68 mph, the first acceleration phase ends and the first coast-down phase 14 begins.

The first coast-down phase continues with vehicle velocity decreasing from 68 mph. When vehicle velocity ceases being greater than 65 mph, which is 62 mph in this example, the first coast-down phase ends and the second acceleration phase 12 begins.

FIG. 1 can be considered as one specific example of an implementation of the strategy and should not be construed as limiting the strategy in any way. FIG. 1 is intended to show the strategy as a repeating pattern of intermittent periods of vehicle acceleration, each followed by a period of vehicle deceleration.

The strategy continues in this manner until use of the strategy is discontinued.

In the example of FIG. 1, 65 mpg may be considered a target velocity, 68 mph may be considered an upper velocity limit, and 62 mph may be considered a lower velocity limit. Each of those three parameters can be set to different values in different implementations of the strategy in any vehicle which is capable of employing the strategy. In this example the difference between the target velocity and the upper velocity limit is equal to difference between the target velocity and the lower velocity limit. The strategy can be implemented in a controller, or multiple controllers acting in concert, to control various components of the vehicle's powertrain (prime mover, drivetrain, and drive wheels). Implementation is facilitated when the vehicle has a cruise control system which, when used, operates to control vehicle velocity to a settable target velocity.

Because a cruise control system is a feedback control system which relies on an error signal representing difference between a set target velocity and actual vehicle velocity for controlling vehicle velocity to a target velocity within a margin of hysteresis, changes in forces acting on the vehicle which cause the vehicle's velocity to either fall below target velocity or rise above target velocity will cause the cruise control system to seek to restore the set target velocity.

Figure 2:
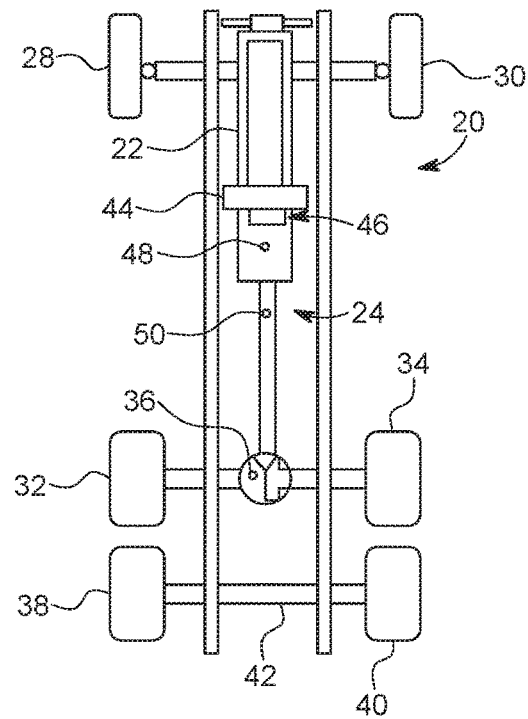
FIG. 2 is a diagram of one example of a vehicle having an internal combustion engine coupled through a drivetrain to drive wheels which propel the vehicle.

FIG. 2 shows a chassis of a vehicle 20 having as its prime mover an internal combustion engine 22 which is coupled through a drivetrain 24 to drive wheels which propel the vehicle. Vehicle 20 is an example of a highway tractor which in the trucking industry is referred to as having a 6×2 configuration, meaning it has a total of six wheels, two of which are drive wheels, and four of which are non-drive wheels. Wheels 28, 30 are front steering wheels, wheels 32, 34 are rear drive wheels of a drive axle 36, and wheels 38, 40 are wheels of a tag axle 42 which is rearward drive axle 36. Commonly, wheels 32, 34, 38, 40 are dual wheels.

Drivetrain 24 comprises, in rearward succession from engine 22, a drive clutch 44, an overrun clutch 46, a transmission 48, and a drive shaft 50.

Figure 3:
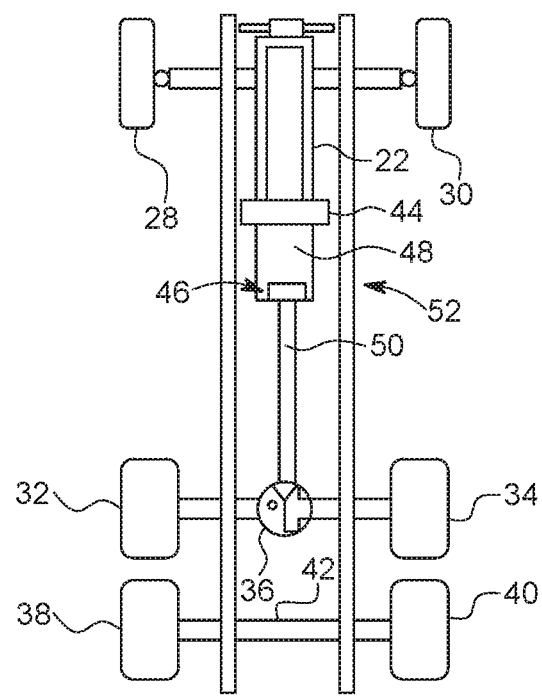
FIG. 3 is a diagram of another example of a vehicle which is similar in most respects to the vehicle of FIG. 2.

FIG. 3 shows a chassis of a vehicle 52 which differs from vehicle 20 only in that overrun clutch 46 is between transmission 48 and drive shaft 50 rather than between drive clutch 44 and transmission 48.

Overrun clutch 46 allows through-flow of power in a direction from engine 20 toward drive wheels 32, 34 during an acceleration phase 12 while disallowing road forces acting on the drive wheels from acting as a torque load on engine 20 during a deceleration phase 14.

Figure 4:
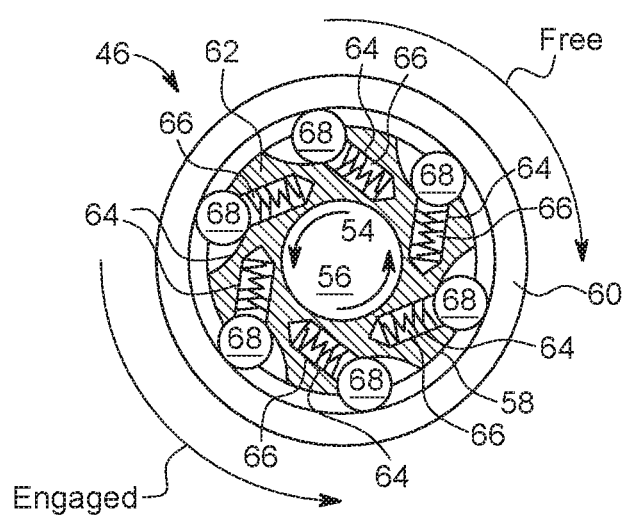
FIG. 4 is a cross section diagram of a mechanism in the drivetrain.

FIG. 4 shows overrun clutch 46 to have a central longitudinal axis 54, a shaft 56 which can rotate about axis 54, a clutch mechanism 58 which rotates in unison with shaft 56, and a rotor 60 surrounding clutch mechanism 58. Clutch mechanism 58 comprises a body 62 having an outer circular perimeter which contains identical, uniformly circumferentially spaced sockets 64, each shaped to receive a spring 66 and a ball 68 as shown.

The spring 66 in each socket 64 is urging its respective ball 68 in a direction toward an inner circular perimeter of rotor 60. When shaft 56 rotates counterclockwise it rotates clutch mechanism 58 in the same sense to cause each ball 68 to engage with rotor 60 and thereby cause the rotor to rotate with clutch mechanism 58 and shaft 56 in the counterclockwise sense. This is the locked (engaged) condition of overrun clutch 46.

In vehicle 20, shaft 56 is coupled with engine 22 through drive clutch 44 and in vehicle 52 with engine 22 through transmission 48 and through drive clutch 44.

Rotor 60 is coupled with drive wheels 32, 34 through transmission 48, drive shaft 50 and drive axle 36 in vehicle 20 and in vehicle 52 with drive wheels 32, 34 through drive shaft 50 and drive axle 36.

In a deceleration phase 14, drive wheels 32, 34 are applying more torque to rotor 60 in the clockwise sense than shaft 54 is applying in the counterclockwise sense via clutch mechanism 58, and consequently rotor 60 will simply spin freely in the clockwise sense on clutch mechanism 58. This is the unlocked (free) condition of overrun clutch 46.

Figure 5:
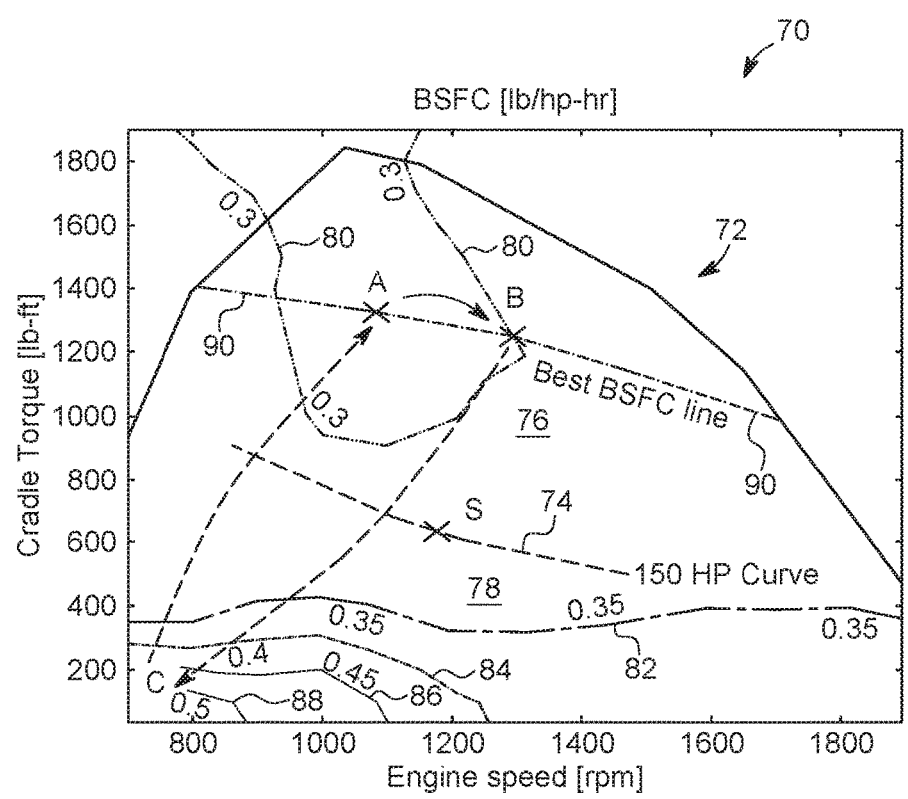
FIG. 5 is a second graph useful in understanding the method of the disclosed strategy for increasing fuel efficiency of a vehicle.

FIG. 5 is a second graph 70 which is used here to explain more detail about how the disclosed strategy increases engine fuel efficiency of a vehicle. The horizontal axis represents engine speed measured in rpm, and the vertical axis represents cradle torque measured in foot-pounds. Cradle torque refers to output torque of an engine's crankshaft as commonly measured using equipment (a cradle for holding the engine) when associated with an engine dynamometer which can apply different loads to the engine for evaluating engine performance.

Graph 70 contains a representative engine map 72 which serves to illustrate relationships between various parameters associated with operation of engine 22. A line 74 defines various combinations of cradle torque and engine speed which provide a constant power output of 150 hp in this example. For other constant power output values, lines having shapes generally similar to that of line 74 can be defined within map 72, but they are not specifically shown and marked by reference numerals. Lines of constant power greater than 150 hp are present in a zone 76 of map 72 above line 74. Lines of constant power below 150 hp are present in a zone 78 of map 72 below line 74.

Another parameter which is shown by multiple lines on map 72 is brake specific fuel consumption (BSFC) which is measured in pounds per horsepower-hour (lb/hp-hr). A BSFC line 80 connects scattered points having a BSFC value of 0.3, a BSFC line 82 connects scattered points having a BSFC value of 0.35, a BSFC line 84 connects scattered points having a BSFC value of 0.4, a BSFC line 86 connects scattered points having a BSFC value of 0.45, and a BSFC line 88 connects scattered points having a BSFC value of 0.5.

Smaller values of BSFC indicate better fuel efficiency values than do larger values of BSFC. From comparison of these BSFC lines, it is apparent that engine fuel efficiency in the uppermost portion of zone 76 provides best fuel economy. A line 90 represents a "best-fit" line for BSFC line 80.

Map 72 relates to graph 10 of FIG. 1 in the following way.

For the purpose of explanation, let it be assumed that at time zero in graph 10, vehicle 22 is traveling at 65 mph, overrun clutch 46 is locked, and engine 22 is operating at a constant 150 hp, i.e. along line 74 (as indicated by S in map 72).

When the disclosed strategy commences under those conditions, increased fueling of engine 22 will produce increasing torque which begins to accelerate the vehicle and to decrease BSFC. The combination of increasing torque and increasing engine speed of course produces increasing power to drive wheels 32, 34. Fueling continues to be controlled to make engine 22 operate along torque/speed lines of progressively increasing power in zone 76.

FIG. 5 shows an example where engine 22 reaches operation along a portion of line 90 between points A and B before vehicle velocity reaches the 68 mph upper velocity limit shown in FIG. 1. When that upper vehicle velocity limit is reached, the first deceleration phase 14 commences with overrun clutch 46 becoming unlocked and with engine fueling being stopped, or at least greatly reduced, until either engine 22 completely stops or reaches a low idle speed at which it continues to operate with a small quantity of fueling. This sudden change in engine operation at the beginning of deceleration phase 14 is indicated in FIG. 5 by an arrow from point B to point C. Engine 22 continues to operate in the vicinity of point C during the deceleration phase until vehicle velocity reaches the 62 mph lower velocity limit shown in FIG. 1.

When the lower velocity limit is reached, the second acceleration phase 12 begins. Engine fueling is immediately increased to ultimately return engine operation to line 90 as indicated by the arrow from point C to point A. Initially however, fueling may be controlled to bring engine 22 to an engine speed at which overrun clutch 46 will smoothly re-lock.

By placement of overrun clutch 46 between transmission 48 and drive shaft 50 as in vehicle 20, the load of drive wheels 32, 34 rotates only the mechanism of drive axle 36 and drive shaft 50 in the deceleration phase when the overrun clutch is unlocked. In vehicle 50, transmission 48 will be rotated as well. Consequently, when the overrun clutch in either vehicle is unlocked, the drive wheels cannot back-drive the engine which, if back-driven, would act to brake the vehicle. The only back-driven components are the rotating mechanisms of drive axle 36 and drive shaft 50, with the mechanism of transmission 48 also being included in the case of vehicle 52.

By using a method employing the disclosed strategy of a repeating engine operating cycle comprising an acceleration phase followed by a deceleration phase which collectively maintain an average vehicle speed, fuel efficiency is increased in comparison to continuously running the engine to maintain a constant vehicle speed equal to the same average vehicle speed attained by the repeating acceleration/deceleration operating cycle because the engine operates for some of the cycle time within a maximum engine power range where fuel efficiency is greater and for the remainder of the cycle time within a minimum engine power range while the engine is relieved of the being back-driven by the drive wheels. The total fuel used during the acceleration phase and during the deceleration phase is less than the fuel used when the engine is continuously run to maintain constant vehicle speed because of the ability to take advantage of part time engine operation within the maximum engine power range and of part time operation in a minimum engine power range where less fuel is introduced into the engine and the drive wheels are prevented from back-driving the engine.

What is claimed is:

1. A method of operating a vehicle having an internal combustion engine coupled through a drivetrain to drive wheels which propel the vehicle, the method comprising:
    a) when the vehicle is traveling at a target velocity which is being maintained by control of engine fueling in accordance with a torque/speed map for the engine to control power to the drive wheels, initiating an acceleration phase by increasing the quantity of fuel being introduced into the engine to cause the engine to accelerate into a zone of the map in which fuel efficiency is greater than fuel efficiency when the engine is traveling at the target velocity, thereby causing the vehicle to accelerate by increasing power flow from the engine through a power flow path to the drive wheels;
    b) when acceleration of the vehicle has caused vehicle velocity to become greater than an upper velocity limit, terminating the acceleration phase and initiating a deceleration phase by reducing the quantity of fuel being introduced into the engine sufficiently to cause the engine to decelerate into a zone of the map in which fuel efficiency is less than fuel efficiency when the vehicle is traveling at the upper velocity limit and by also interrupting the power flow path to prevent the drive wheels from back-driving the engine, thereby allowing the vehicle to decelerate; and
    c) when the vehicle has decelerated to a vehicle velocity which no longer exceeds the target velocity, terminating the deceleration phase by restoring the power flow path and initiating the acceleration phase.

2. The method as set forth in claim 1 in which terminating the deceleration phase by restoring the power flow path and initiating the acceleration phase commences when the vehicle has decelerated to a lower velocity limit which is less than the target velocity.

3. The method as set forth in claim 2 in which difference between the target velocity and the upper velocity limit is equal to difference between the target velocity and the lower velocity limit.

4. The method as set forth in claim 1 in which interrupting the power flow path to prevent the drive wheels from back-driving the engine is caused by unlocking a mechanism in the drivetrain.

5. The method as set forth in claim 1 in which interrupting the power flow path to prevent the drive wheels from back-driving the engine is caused by unlocking an overrun clutch in the drivetrain.

6. The method as set forth in claim 1 in which the acceleration phase causes the engine to accelerate into a zone of the map and operate with a defined BSFC.

7. The method as set forth in claim 6 in which defined BSFC is defined by a best fit line in the zone of the map best fitted to scattered points having the same BSFC value.

8. A vehicle comprising:
   an internal combustion engine coupled through a drivetrain to drive wheels which propel the vehicle, a fueling system for introducing fuel into the engine, a mechanism in the drivetrain for coupling and uncoupling the engine to and from the drive wheels, and at least one controller for controlling operation of the engine and the vehicle;
   the at least one controller being operable:
   a) to control engine fueling in accordance with a torque/speed map for the engine to control power to the drive wheels which maintains a target velocity for the vehicle with the mechanism coupling the engine to the drive wheels;
   b) with the mechanism coupling the engine to the drive wheels, to perform an acceleration phase by increasing the quantity of fuel being introduced into the engine to cause the engine to accelerate into a zone of the map in which fuel efficiency is greater than fuel efficiency when the engine is traveling at the target velocity and thereby cause the vehicle to accelerate by increasing power flow from the engine through the drivetrain to the drive wheels;
   c) to terminate the acceleration phase when acceleration of the vehicle has caused vehicle velocity to become greater than an upper velocity limit, and initiate a deceleration phase by reducing the quantity of fuel being introduced into the engine sufficiently to cause the engine to decelerate into a zone of the map in which fuel efficiency is less than fuel efficiency when the vehicle is traveling at the upper velocity limit and by also causing the mechanism to uncouple the engine from the drive wheels, thereby allowing the vehicle to decelerate; and
   d) when the vehicle has decelerated to a vehicle velocity which no longer exceeds the target velocity, to terminate the deceleration phase by causing the mechanism to re-couple the engine to the drive wheels and to initiate the acceleration phase.

9. The vehicle as set forth in claim 8 in which the at least one controller is operable to terminate the deceleration phase and initiate the acceleration phase when the vehicle has decelerated to a lower velocity limit which is less than the target velocity.

10. The vehicle as set forth in claim 9 in which difference between the target velocity and the upper velocity limit is equal to difference between the target velocity and the lower velocity limit.

11. The vehicle as set forth in claim 8 in which the mechanism comprises an overrun clutch.

12. The vehicle as set forth in claim 11 in which the overrun clutch is disposed in the drivetrain between a drive shaft and a transmission.

13. The vehicle as set forth in claim 11 in which the overrun clutch is disposed in the drivetrain between a transmission and a drive clutch.

14. The vehicle as set forth in claim 6 in which the at least one controller is operable during the acceleration phase to cause the engine to accelerate into a zone of the map and operate with a defined BSFC.

15. The vehicle as set forth in claim 14 in which defined BSFC is defined by a best fit line in the zone of the map best fitted to scattered points having the same BSFC value.

* * * * *

UNITED STATES PATENT AND TRADEMARK OFFICE
CERTIFICATE OF CORRECTION

| | |
|---|---|
| PATENT NO. | : 10,005,466 B2 |
| APPLICATION NO. | : 15/463798 |
| DATED | : June 26, 2018 |
| INVENTOR(S) | : Wu et al. |

It is certified that error appears in the above-identified patent and that said Letters Patent is hereby corrected as shown below:

In the Specification

On Column 1, Line 14, before the "BACKGROUND", please insert the following paragraph:
-- STATEMENT REGARDING FEDERALLY SPONSORED RESEARCH OR DEVELOPMENT
This invention was made with government support under DE-EE0007767 awarded by the U.S. Department of Energy. The Government therefore has certain rights in the invention. --

Signed and Sealed this
Thirty-first Day of January, 2023

Katherine Kelly Vidal
*Director of the United States Patent and Trademark Office*